US011458852B2

(12) United States Patent
Books et al.

(10) Patent No.: US 11,458,852 B2
(45) Date of Patent: Oct. 4, 2022

(54) DC-DC CONVERTER CONTROL

(71) Applicant: Cummins Inc., Columbus, IN (US)

(72) Inventors: Martin T. Books, Columbus, IN (US); Joseph E. Paquette, Columbus, IN (US); Patrick Kaufman, Vacaville, CA (US); Elizabeth Weitzel, Vacaville, CA (US); Galdino Ferretiz, Davis, CA (US); Yuanchun Cai, Davis, CA (US)

(73) Assignee: Cummins Inc., Columbus, IN (US)

(*) Notice: Subject to any disclaimer, the term of this patent is extended or adjusted under 35 U.S.C. 154(b) by 0 days.

(21) Appl. No.: 17/246,305

(22) Filed: Apr. 30, 2021

(65) Prior Publication Data

US 2021/0354577 A1 Nov. 18, 2021

Related U.S. Application Data

(60) Provisional application No. 63/024,689, filed on May 14, 2020.

(51) Int. Cl.
*B60L 1/00* (2006.01)
*B60L 53/24* (2019.01)
*H02M 3/00* (2006.01)

(52) U.S. Cl.
CPC ............. *B60L 53/24* (2019.02); *H02M 3/00* (2013.01); *B60L 2210/10* (2013.01)

(58) Field of Classification Search
CPC ..... Y02T 10/7072; Y02T 10/70; Y02T 90/14; B60L 53/24; B60L 2210/10; H02J 1/082; H02J 2310/48; H02J 1/14; H02M 3/00
See application file for complete search history.

(56) References Cited

U.S. PATENT DOCUMENTS

| | | | | |
|---|---|---|---|---|
| 8,030,884 B2* | 10/2011 | King | .................. | B60L 53/22 320/104 |
| 8,120,290 B2* | 2/2012 | King | .................. | B60L 50/15 318/139 |
| 2012/0181854 A1* | 7/2012 | Gopalakrishnan | ...... | B60L 58/15 307/9.1 |
| 2017/0110996 A1* | 4/2017 | Frampton | ............... | H02P 25/22 |
| 2018/0167002 A1* | 6/2018 | Frampton | ............. | H02J 7/1492 |
| 2018/0233925 A1* | 8/2018 | Boehmer | .......... | H02M 3/33584 |
| 2019/0056757 A1* | 2/2019 | Bollman | ................ | H02M 3/07 |

* cited by examiner

*Primary Examiner* — Jared Fureman
*Assistant Examiner* — Esayas G Yeshaw
(74) *Attorney, Agent, or Firm* — Faegre, Drinker, Biddle & Reath LLP

(57) ABSTRACT

A method to control an output voltage of a DC-DC converter, and voltage control logic operable to generate a voltage command to implement the control method, the method including sensing a voltage of a bus of an electric-drive vehicle; increasing a command voltage signal from the sensed voltage to a nominal voltage during a first time period; increasing the command voltage signal from the nominal voltage to a desired voltage during a second time period greater than the first time period; and generating a voltage output based on the command voltage signal.

21 Claims, 7 Drawing Sheets

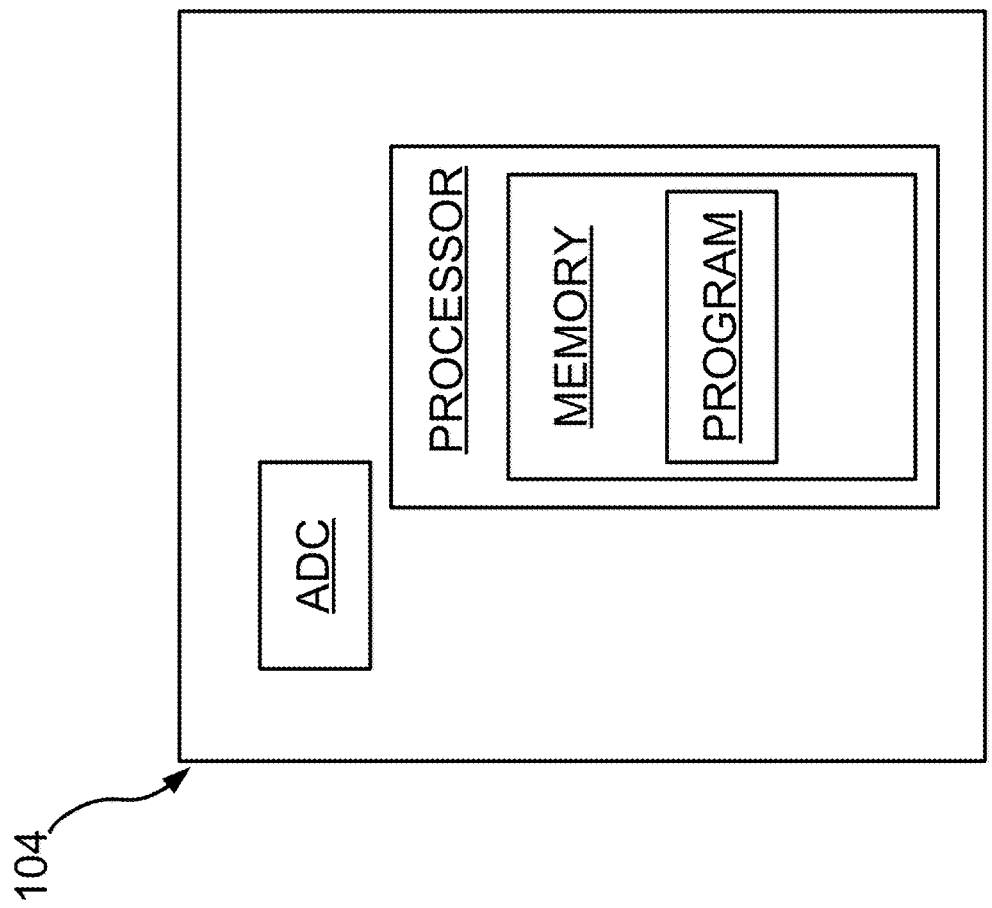

DC-DC CONVERTER CONTROL

CROSS-REFERENCE TO RELATED APPLICATIONS

This application claims the benefit of and priority from U.S. Provisional Patent Application No. 63/024,689, filed May 14, 2020, which is incorporated by reference herein in its entirety.

FIELD OF THE DISCLOSURE

A system and a method for converting direct-current power from a high voltage power source to supply a load including a low voltage battery.

BACKGROUND OF THE DISCLOSURE

DC/DC converters convert a direct-current (DC) voltage to a DC voltage of a different level. These converters can step-up or step-down the incoming voltage. Some DC/DC converters have a fixed step-up ratio. Other DC/DC converters control the output voltage to a target voltage irrespective of the amount of current flowing as a result. Protective circuits may be included to prevent damage of the converter in case that the currents are excessive or above the characteristic limits of the components of the converter.

It is desirable to control DC/DC converters respecting the characteristics of the loads receiving power from the DC/DC converters.

SUMMARY

A DC/DC converter, a system including the DC/DC converter for use with an electric drive vehicle, and a method of charging a low voltage battery of an electric drive vehicle are disclosed.

In one embodiment, a method to control an output voltage of a DC-DC converter includes sensing a voltage of a bus of an electric-drive vehicle; increasing a command voltage signal from the sensed voltage to a nominal voltage during a first time period; increasing the command voltage signal from the nominal voltage to a desired voltage during a second time period greater than the first time period; and generating a voltage output based on the command voltage signal.

In one embodiment, voltage control logic is operable to generate a voltage command to implement a control method, the method including sensing a voltage of a bus of an electric-drive vehicle; increasing a command voltage signal from the sensed voltage to a nominal voltage during a first time period; increasing the command voltage signal from the nominal voltage to a desired voltage during a second time period greater than the first time period; and generating a voltage output based on the command voltage signal.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some or none of the enumerated advantages.

DESCRIPTION OF THE DRAWINGS

The features and advantages of the disclosure will become more readily appreciated as the same become better understood by reference to the following detailed description when taken in conjunction with the accompanying drawings, where:

FIG. 7 is a block diagram of an embodiment of voltage command logic.

Figure 1:
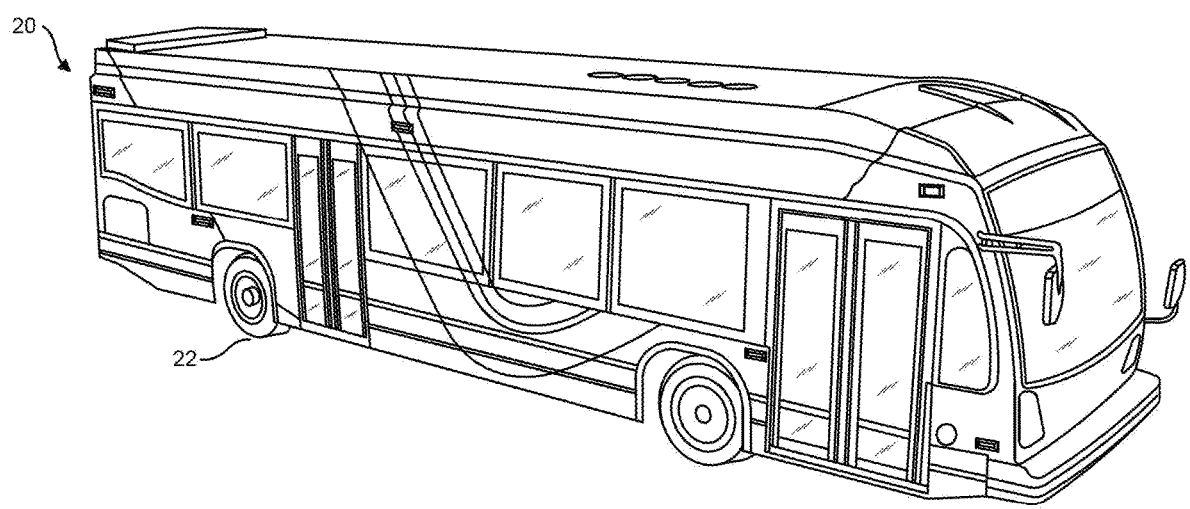
FIG. 1 is a perspective view of a vehicle with an electric drive.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the claims in any manner.

DETAILED DESCRIPTION

For the purposes of promoting an understanding of the principles of the disclosure, reference will now be made to the embodiments illustrated in the drawings, which are described below. The embodiments disclosed below are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended.

Except where a contrary intent is expressly stated, terms are used in their singular form for clarity and are intended to include their plural form.

Figure 2:
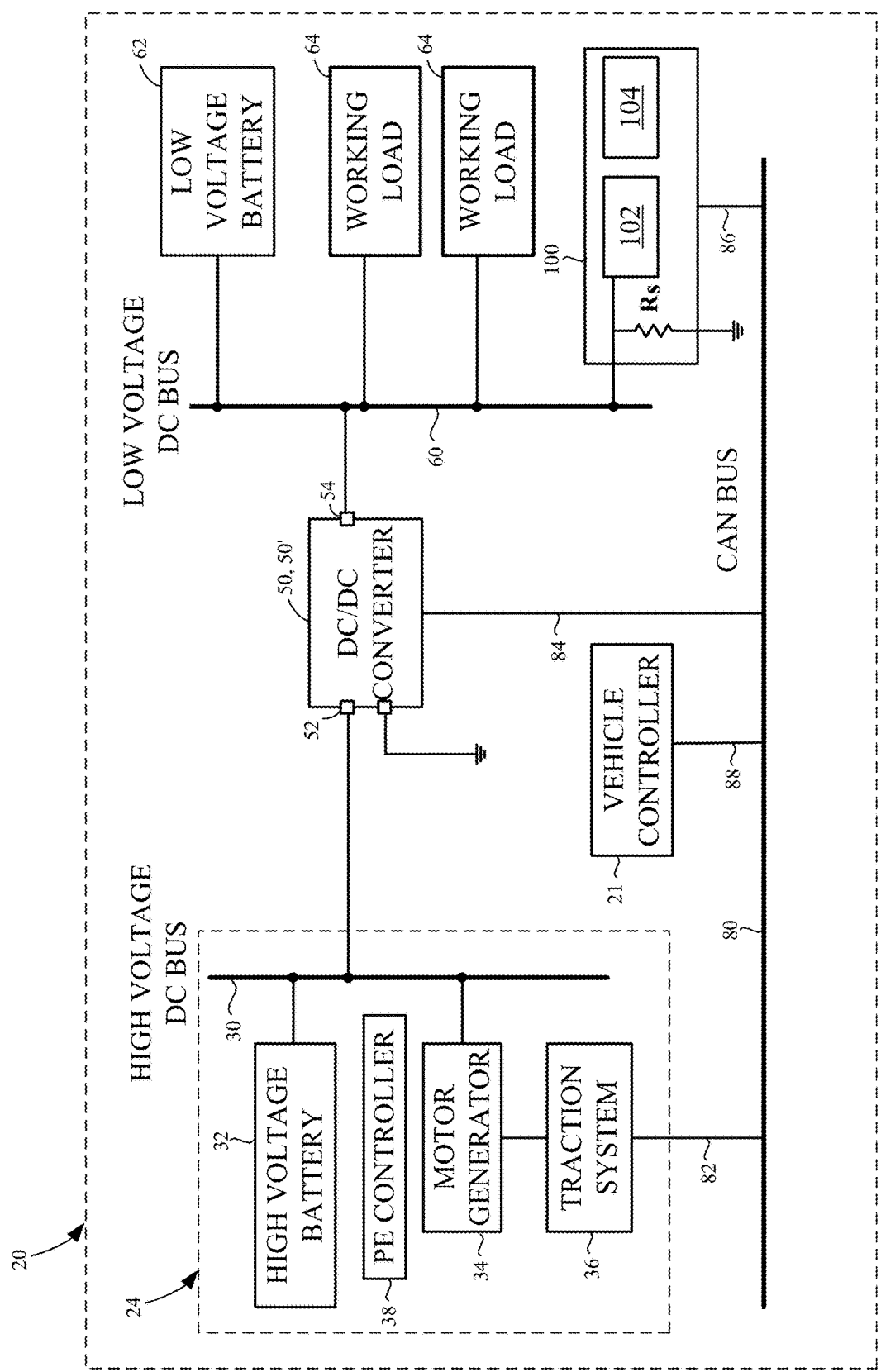
FIG. 2 is a schematic diagram of a power electronics system of a vehicle with an electric drive.

Referring to FIG. 1, an electric drive vehicle 20 is shown including wheels 22. Wheels 22 are part of a traction system of electric drive vehicle 20 driven by a motor generator or perhaps a combination of a motor generator and a combustion engine (e.g. a hybrid vehicle). Referring to FIG. 2, electric drive vehicle 20 comprises a high voltage bus 30, a low voltage bus 60, and a DC/DC converter 50 that draws power from high voltage bus 30 and provides the power to low voltage bus 60 after stepping down the voltage from the high to the low voltage. An electric drive 24 typically comprises a high voltage battery 32 either suppling power or receiving power from high voltage bus 30, a motor generator 34 either suppling power or receiving power from high voltage bus 30, and a traction system 36 driven by motor generator 34. Multiple motor generators and high voltage batteries may be used. The motor generators generate power during braking, for example, and the energy from the generated power is stored in the high voltage batteries. The high voltage batteries can also be charged by a high voltage charger when the vehicle is parked. The traction system may include a housing including clutches and a motor generator, and a shaft engaged and disengaged by at least one of the clutches to drive wheels 22. The shaft may be directly coupled to the wheels (direct drive) or may be connected to the wheels through a differential and a wheel driveshaft.

DC/DC converter 50 has an input contact 52 and an output contact 54. DC/DC converter 54 may include any known power electronic components. Typically, a step-down DC/DC converter will include a buck or buck-boost circuit in which a magnetic field temporarily stores energy and the energy is then released to generate the stepped down voltage. Inductors or transformers are used to generate the magnetic field. Capacitors can be used to store the resulting electric energy. Switches are used to generate a switching magnetic field and the DC/DC converter may thus be referred to as a switch-mode converter. A controller is typically included to control the switching rate of the switches in response to a voltage command. For example, the voltage command may be 15 volts DC. The controller may thus monitor the output voltage associated with output contact 54, or a proxy therefore, and adapt the switching rate to maintain a 15 volt output. However, because the loads may be unpredictable both in terms of demand and aggregate impedance, and include a low voltage battery 62, the controller may not be able to accurately determine the output voltage and, thus, might generate voltage changes detrimental to the life of the low voltage battery. It is expected that the voltage determined by the controller of the DC/DC converter is lower than the actual output voltage, particularly as output current increases. Although a current sensor may be included to improve the control of the output voltage in any particular system, addition of sensors and respective sensing logic increases cost and complexity.

Low voltage bus 60 receives power from contact 54 of DC/DC converter 50 at a low voltage, e.g. less than 100 volts, preferably equal to or less than 50 volts, 24 volts, or 15 volts. Low voltage battery 62 is provided to store energy and potentially power various working loads 64. The term "working load" as used herein is used to refer to loads that consume but do not store energy, such as heaters, lights, communications equipment, fans, and the like. Non-working loads may also be supplied by low voltage bus 60.

Also shown in FIG. 2 is a DC/DC converter controller 100 including a sense resistor $R_S$, and a CAN bus 80 connected by communication lines 82, 84, 86 and 88 to electric drive 24, DC/DC converter 50, DC/DC converter controller 100, and a vehicle controller 21. A CAN bus is a well known distributed control bus in which multiple devices can communicate with each other based on established data and node address protocols. A power electronics controller 38 is typically provided to manage the high voltage battery and motor generator. The power electronics controller may comprise multiple controllers including a controller module included with each high voltage battery and/or each of a plurality of battery modules in a high voltage battery pack. Communication line 82 may be used by vehicle controller 21 to determine the state of charge of the batteries and issue commands to the traction system, such as a torque command, which the traction system uses to energize the motor generator, as is known in the art.

Figure 6:
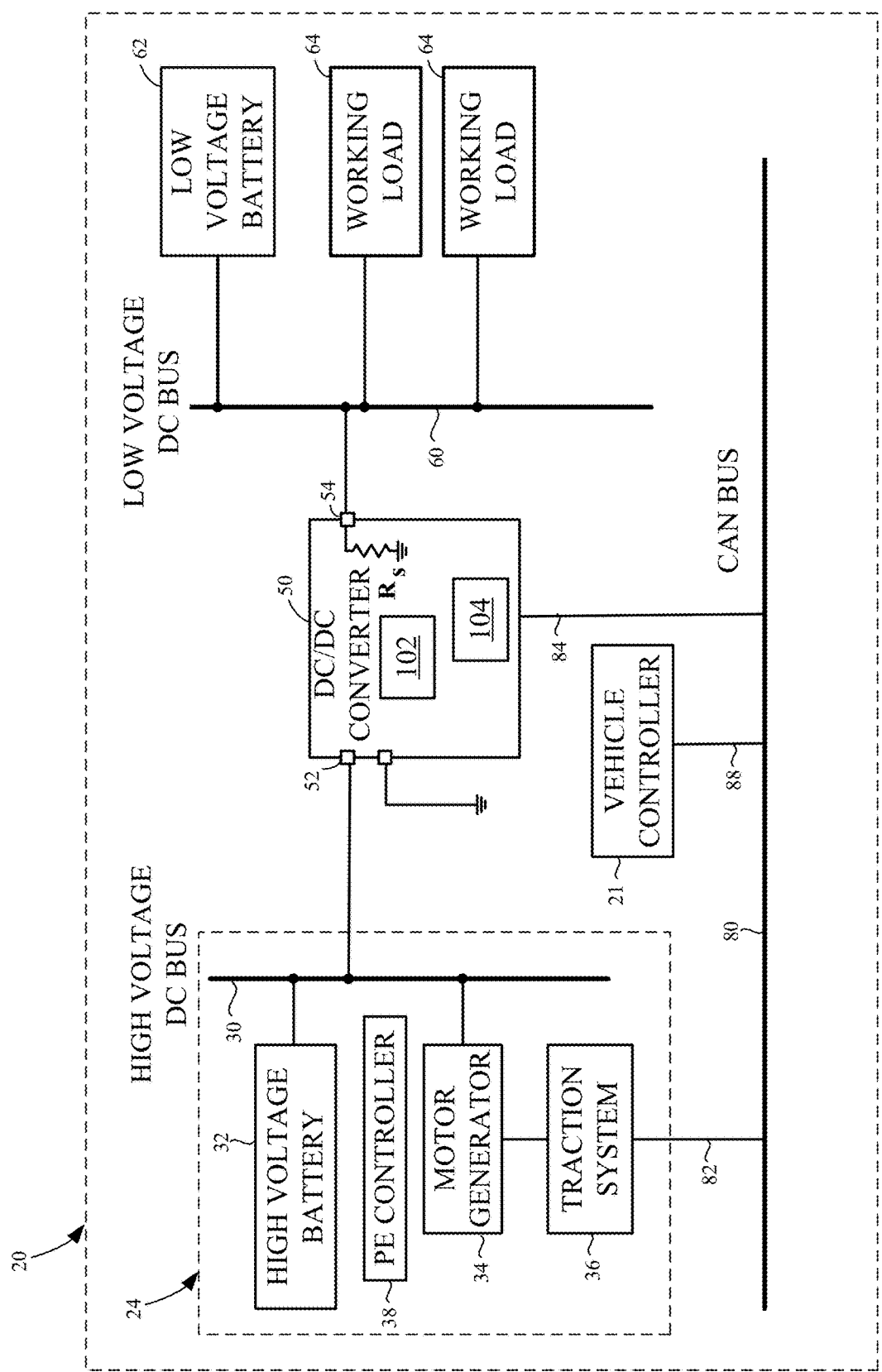
FIG. 6 is a schematic diagram of another embodiment of a power electronics system of a vehicle with an electric drive.

Communication line 84 may be used to send a voltage command to DC/DC converter 50 by DC/DC converter controller 100. The voltage command is discussed below with reference to FIGS. 3 and 4. In one variation, DC/DC converter 50 includes a controller and a voltage sensor to generate an output voltage in a traditional manner and the addition of DC/DC converter controller 100 to the system allows for the generation, via voltage command logic discussed below, and generation by DC/DC converter 50, of a customized voltage. This allows for the customization and increased life of the low voltage batteries powered by the low voltage DC bus using a standard DC/DC converter. In another variation, illustrated in FIG. 6, the DC/DC converter 50 includes the voltage command logic discussed below. Communication line 84 may still be used to communicate faults and other operating characteristics between vehicle controller 21 and DC/DC converter 50.

When the battery charge (and O/L voltage) is low, excessive current flowing to the low voltage battery can shorten battery life. It is desirable to keep the DC/DC converter output voltage such that the charging current is low for a sustained period. The customized voltage command described below illustrates how to initially rise the command voltage to then enable charging for a sustained period with low charging current.

DC/DC converter controller 100 includes a voltage sensor 102 operable to sense a voltage across resistor Rs, and voltage command logic 104. Voltage command logic 104 is operable to, based on the voltage across resistor Rs, generate a customized voltage command, illustratively described with reference to FIGS. 3 and 4, in accordance with the method described with reference to FIG. 5. The term "logic" as used herein includes software and/or firmware executing on one or more programmable processing devices, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed. Logic may comprise processing instructions embedded in non-transitory machine-readable media (e.g. memory).

Figure 3:
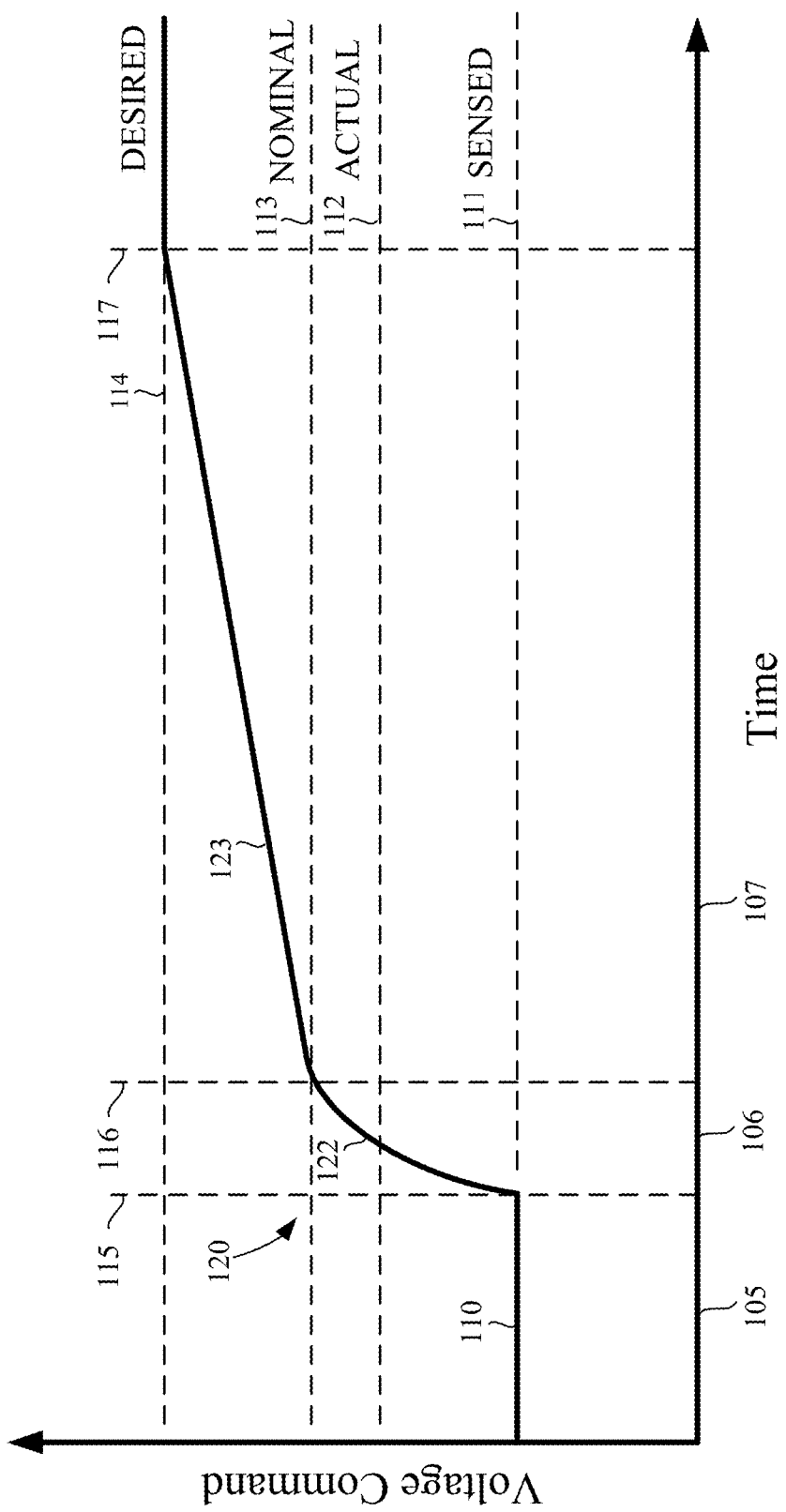
FIG. 3 is a graph of a voltage command scheme implemented in the power electronics system of FIG. 2.

Referring now to FIG. 3, a customized voltage command curve 120 is shown. Prior to implementation of the customized voltage the output of the DC/DC converter is at a base voltage 110 during an initial time period 105. Upon execution of instructions by the voltage command logic, the voltage rises from base voltage 110 in accordance with the voltage command curve 120, as shown in a first segment 122, from the sensed 111 to a nominal voltage 113 during a first time period 106, which is the difference between a first time 115 and a second time 116. A first-order time constant or a quick-ramp algorithm may be used to quickly ramp the voltage, thus mitigating transient voltages resulting from turning on voltage command logic 104. In one example, the ramp-up e.g. first time segment 106, may last less than 2 seconds, and preferably less than about 1 second. Then, the voltage command curve rises as shown in a second segment 123, from the nominal 113 to a desired voltage 114, during a second time period 107 (the "bulk" charging time), which is the difference between a second time 116 and a third time 117. In one example, the charging voltage rises slowly. The slow ramp-up will charge the battery while maintaining the charge current at an acceptable level to minimize battery damage. The actual voltage 112 will be somewhere between the sensed and nominal voltages. The result is a multi-step voltage control process to quickly but safely bring the DC/DC converter output voltage to its ideal maximum setting while simultaneously mitigating risk of harming a low voltage battery fed by the DC/DC converter. In one example, base voltage 110 may be less than 12 VDC, nominal voltage 113 may be about 12 VDC, and desired voltage 114 might be 15 VDC. The second segment 123 may be referred to as the bulk charging phase and the desired voltage 114, or maximum charging voltage, may be set based on known methods. The acceptable level of the charge current to minimize battery damage may be set arbitrarily as a charge current limit, which could depend on the battery size and type. The charge current limit may be adjusted based on temperature. Example temperatures include battery and ambient temperatures. The charge current limit may be set, for example, based on gassing voltage potential of lead acid batteries. The bulk charging time could be set based on operation/drive cycles of the vehicle, for example 30 minutes. However, the bulk charging time could be more or less than 30 minutes and be calibrated for different applications, vehicles and battery systems.

Figure 4:
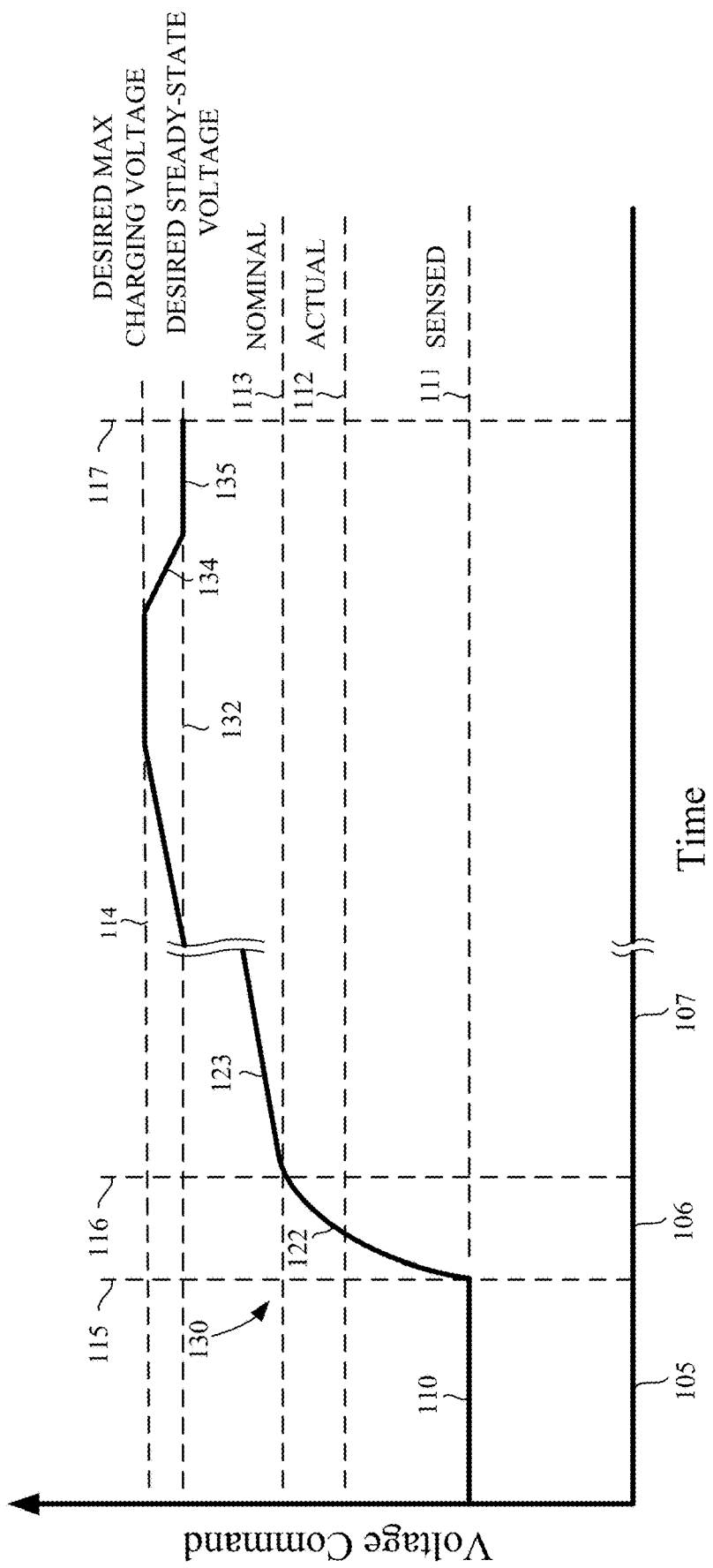
FIG. 4 is another graph of a voltage command scheme implemented in the power electronics system of FIG. 2.

Referring now to FIG. 4, a customized voltage command curve 130 is shown. Voltage command curve 130 includes first segment 122 and second segment 123, which are as described with reference to FIG. 3. Second segment 123 as shown has been truncated, as has been the timeline, to fit the graph in the page, but in practice the segment is unbroken. Voltage command curve 130 also includes a third segment 134, showing reduction of the voltage from desired voltage 114, e.g. 15 VDC, which in this case is the desired maximum charging voltage, to a desired steady-state voltage 132, which may be referred to as the "float" voltage. The third segment 134 may be referred to as the "ramp-down" period, from the bulk to the float voltage, and may be set to an arbitrary and calibratable time sufficient to gradually reduce the voltage. Voltage command curve 130 also includes a fourth segment 135, showing the voltage is maintained at the desired steady-state voltage 132. The result is a multi-step voltage control process to quickly but safely bring the DC/DC converter output voltage to its ideal maximum setting while simultaneously mitigating risk of harming a low voltage battery fed by the DC/DC converter, and then reducing or ramping down the voltage to a desired steady-state voltage, e.g. 14 VDC. The float voltage can be set to different levels based on temperature, for example, and other factors. Example temperatures include battery and ambient temperatures. A float voltage based on average environmental conditions of about 25 degrees Celsius could be, for example, 13.8 VDC. This addresses the competing interests of charging a battery quickly and also charging at a voltage level that is low enough to maximize the life of the battery. The dwell time and the ramp-down time may be short, in the order of seconds.

Figure 5:
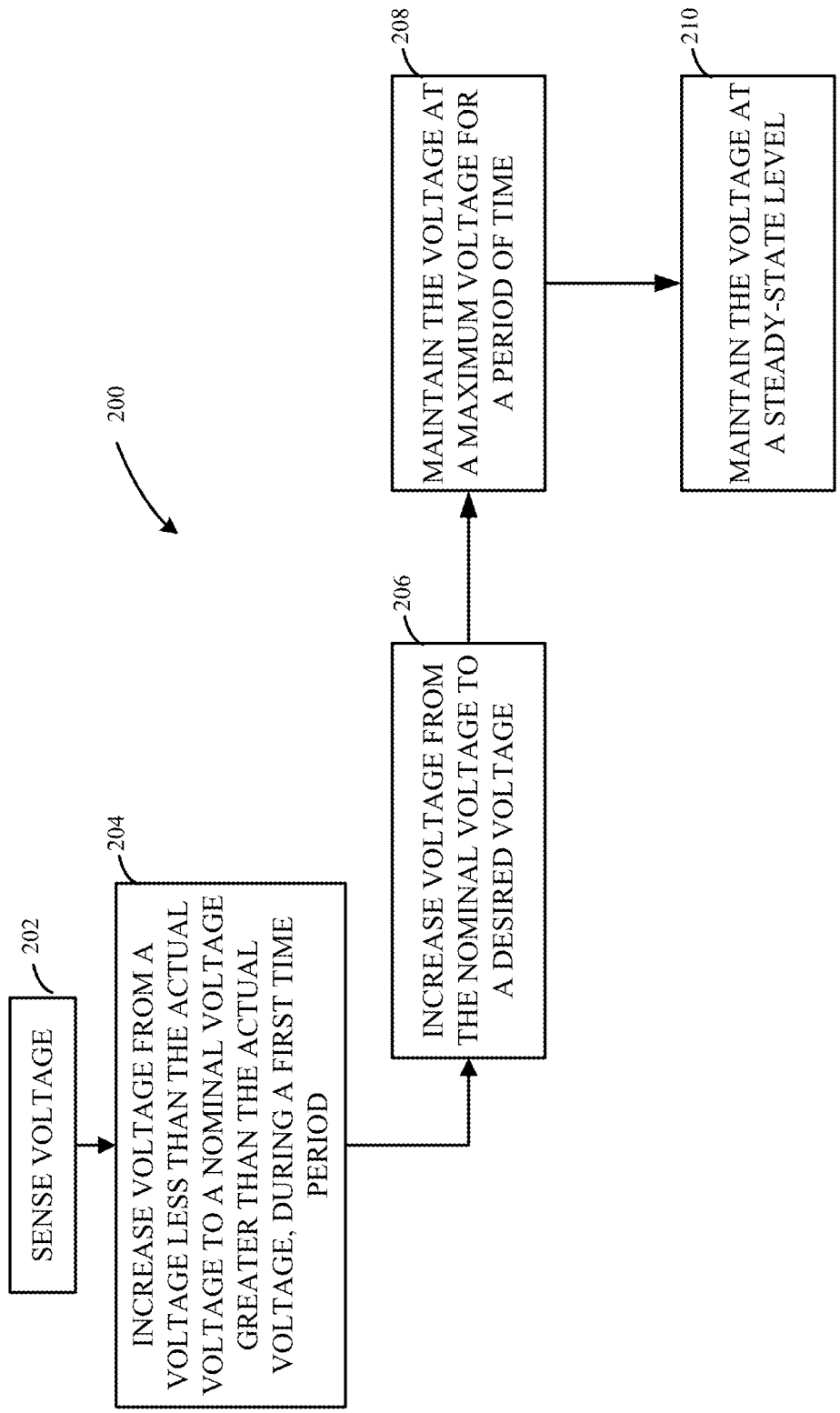
FIG. 5 is a flowchart of a control algorithm to generate the voltage command scheme of FIGS. 3 and 4.

Implementation by voltage command logic 104 of a method to control DC/DC converter 50 in accordance with voltage command curve 120 or 130 will now be described with reference to a flowchart 200 illustrated in FIG. 5. Initially, the bus voltage is sensed, at 202. It is expected that the sensed voltage is less than the actual voltage. Then, at 204, the voltage command is increased during a first time period. During this period the voltage command is increased rapidly and may be increased continuously but not necessarily at a constant rate of increase. The increase may be programmed to provide smooth transitions and avoid spikes. The command voltage increases from a voltage less than the actual voltage to a voltage greater than the actual voltage. The actual curvature can be generated from a mathematical first order formula or by reading a look-up table comprising values representing the custom command curve in incremental time periods. The first segment of the custom command curve may be linear. The first time period is much shorter than the second time period. The first time period may be less than 10 seconds, preferably less than 5 seconds. Quickly increasing the command voltage to the nominal level will reduce any transients of bringing DC/DC converter online and get its output level to a point where further battery drainage will be halted. Thus, the nominal voltage may be set based on a voltage at which the battery drainage will cease.

Once a nominal voltage is reached, the voltage command is increased less rapidly, at 206, during a second time period. The voltage command may be increased at a constant rate during the second time period except for the initial portion of the time period, during which the voltage command transitions from the first segment to the second segment of the custom voltage curve. Optionally, the final portion of the second segment may also be curved to transition to the desired voltage smoothly. The second segment may be linear except for the transition sections. The desired voltage may be a maximum bus voltage limit. During the second time period the battery charging current will be proportional to the difference between the DC/DC converter output voltage and the open-loop voltage of the battery. The voltage command is then maintained, at 208, at the desired voltage level.

Optionally, in one variation, the maximum charging voltage is maintained for a period of time, a dwell time, and then, at 210, the voltage is ramped down to a desired steady-state voltage.

FIG. 7 is a block diagram of an embodiment of voltage command logic 104. In this embodiment voltage command logic 104 includes an analog-to-digital converter to digitize the voltage of the sense resistor Rs, a processor, memory, and a program. The program includes instructions to periodically sense the voltage of the sense resistor and to output a value of the voltage command. The ADC, processor, and memory may be implemented in a single integrated circuit, such as a system-on-a-chip or SoC. The SoC may also have an analog output pin to output the voltage command in analog form. The memory may include tables comprising digital representations of the voltage command curve, in which case the processor reads a voltage command value associated with the sensed voltage and then increments the voltage command by reading successive values from the table. The processor may sense the voltage upon startup of the voltage command logic. The desired and nominal voltages may be stored in memory or be programmed by the user of the vehicle.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An electric drive vehicle comprising:
   a high voltage bus;
   a motor-generator electrically connected to the high voltage bus;
   a low voltage bus;
   a low voltage battery electrically connected to the low voltage bus;
   a DC/DC converter powered from the high voltage bus and supplying an output voltage to the low voltage bus, the output voltage based on a voltage command; and
   voltage command logic operable to generate the voltage command to control the DC/DC converter, the voltage command including:
   a first segment during a first time period where the voltage command causes a voltage to increase from a sensed voltage to a nominal voltage followed by a second segment during a second time period where the voltage command causes the voltage to increase from the nominal voltage to a desired voltage, wherein the voltage command in the first segment causes the voltage to rise more rapidly than in the second segment, followed by a third segment during a third time period where the voltage command causes the voltage to decrease from the desired voltage to a steady-state voltage.

2. The electric drive vehicle of claim 1, wherein the voltage command in the first segment causes the voltage to rise rises in a continuous manner at a decreasing rate of change from the sensed voltage to the nominal voltage in a continuous manner in less than 5 seconds, wherein the voltage command in the second segment causes the voltage to rise rises in a continuous manner from the nominal voltage to the desired voltage in a continuous manner at a substantially constant rate in greater than 25 seconds.

3. The electric drive vehicle of claim I, wherein the third segment during athe third time period is followed by a fourth segment, wherein during the fourth segment the voltage command maintains the stead state voltage.

4. The electric drive vehicle of claim 1, wherein the DC/DC converter comprises a housing and the voltage command logic is located within the housing.

5. The electric drive vehicle of claim 2, wherein the DC/DC converter is communicatively coupled to the voltage command logic to receive the voltage command from the voltage command logic.

6. The electric drive vehicle of claim 5, wherein the DC/DC converter is communicatively coupled to the voltage command logic via a CAN bus.

7. A method of controlling a DC/DC converter, comprising;
providing a DC/DC converter sized and structured to step down a high voltage to an output voltage based on a voltage command; and
executing voltage command logic to generate the voltage command, the voltage command including a first segment during a first time period where the voltage command causes a voltage to increase from a sensed voltage to a nominal voltage followed by a second segment during a second time period where the voltage command causes the voltage to increase from the nominal voltage to a desired voltage, wherein the voltage command in the first segment causes the voltage to riserises more rapidly than in the second segment, followed by a third segment during a third time period where the voltage command causes the voltage to decrease from the desired voltage to a steady-state voltage.

8. The method of claim 7, further comprising sensing the output voltage, wherein the voltage command logic causes the voltage command, in the first segment, to cause the voltage to rise from the sensed voltage to the nominal voltage in a continuous manner in less than 5 seconds, and in the second segment, to cause the voltage to rise from the nominal voltage to the desired voltage in a continuous manner in more than 25 seconds.

9. The method of claim 7, further comprising, by the voltage command logic, outputting the voltage command, and by the DC/DC converter, receiving the voltage command.

10. The method of claim 7, wherein the third segment during the third time period is followed by a fourth segment, wherein during the fourth segment the voltage command maintains the steady state voltage.

11. A DC/DC converter comprising:
an input contact adapted for connection to a high voltage bus;
an output contact adapted for connection to a low voltage bus; and
voltage command logic operable to generate a voltage command to control the DC/DC converter to convert a voltage at the input contact to a voltage at the output contact, the voltage command including a first segment during a first time period where the voltage command causes the voltage to increase from a sensed voltage to a nominal voltage followed by a second segment during a second time period where the voltage command causes the voltage to increase from the nominal voltage to a desired voltage, wherein the voltage command in the first segment causes the voltage to rise more rapidly than in the second segment, followed by a third segment during a third time period where the voltage command causes the voltage to decrease from the desired voltage to a steady-state voltage.

12. The DC/DC converter of claim 11, wherein the voltage command in the first segment causes the voltage to rise from the sensed voltage to the nominal voltage in a continuous manner.

13. The DC/DC converter of claim 12, wherein the voltage command in the first segment causes the voltage to rise in a continuous manner at a decreasing rate of change.

14. The DC/DC converter of claim 13, wherein the voltage command in the second segment causes the voltage to rise from the nominal voltage to the desired voltage in a continuous manner.

15. The DC/DC converter of claim 11, wherein the first time period is less than 5 seconds and the second time period is greater than 25 seconds.

16. The DC/DC converter of claim 15, wherein the first time period is less than 2 seconds.

17. The DC/DC converter of claim 11, wherein the voltage command in the second segment causes the voltage to rise in a continuous manner.

18. The DC/DC converter of claim 16, wherein the voltage command in the second segment causes the voltage to rise at a substantially constant rate.

19. The DC/DC converter of claim 11, wherein the a third segment during the third time period is followed by a fourth segment, wherein the voltage command maintains the steady-state voltage during the fourth segment.

20. The DC/DC converter of claim 11, wherein the DC/DC converter comprises a housing and the voltage command logic is located within the housing.

21. The DC/DC converter of claim 11, wherein the DC/DC converter is communicatively coupled to the voltage command logic to receive the voltage command from the voltage command logic.

* * * * *